E. P. RUSSELL.
STRAW CUTTER.
No. 14,410. Patented Mar. 11, 1856,
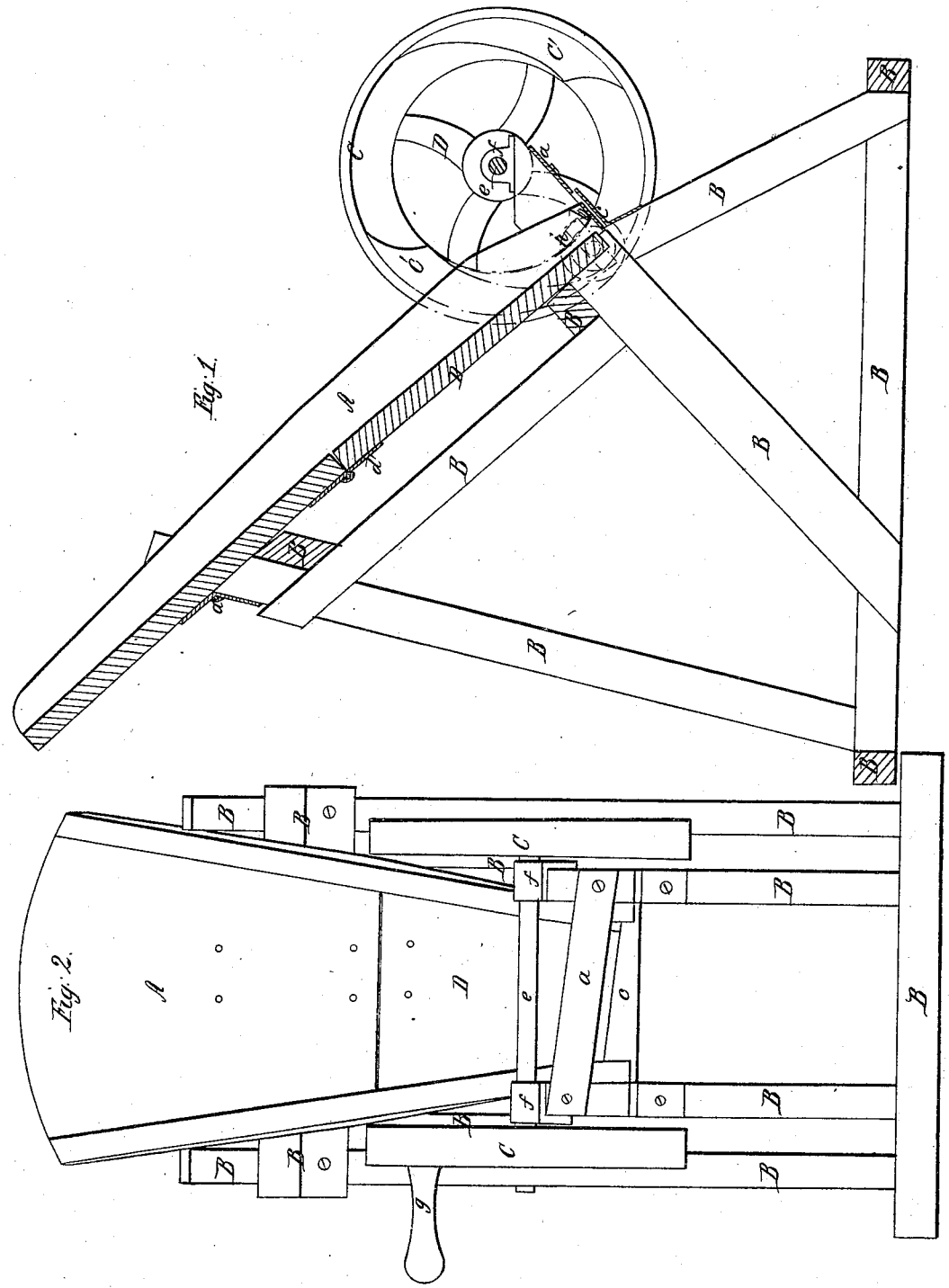

UNITED STATES PATENT OFFICE.

EDWIN P. RUSSELL, OF MANLIUS, NEW YORK.

STRAW-CUTTER.

Specification of Letters Patent No. 14,410, dated March 11, 1856.

*To all whom it may concern:*

Be it known that I, E. P. RUSSELL, of the town of Manlius, county of Onondaga, and State of New York, have invented a new and Improved Straw-Cutter; but I do hereby declare that the following is a full and exact description of the same, reference being had to the accompanying drawings and to the letters of reference marked thereon.

Figure 1 is a side elevation. Fig. 2 is a front view.

To enable others skilled in the art to make and use my invention I will proceed to describe its construction and operation.

In the construction of my invention A is the box; B, the frame; C, the fly wheel; C′, the cams; D, the adjustable or movable bottom; a, the stationary knife; b, the movable knife attached to the box; c, the guage for regulating the length of the straw when cut; d, the hinge or pivot on which the box plays up and down; d′, the hinge on which the movable bottom plays.

Fig. 2: A is the box; B the frame; C, the wheels; C′, the cams; D, the adjustable bottom; a, the stationary knife; e, the guard; e, the shaft on which the wheels unattached; f the journals; g, the handle or crank.

In the operation of my invention the motion is given to it by the handle, the wheel operating as the crank, or if power is applied, it can be applied to the fly wheels the periphery of which is broad enough for a band to run on. On the inner surfaces of the rims of the wheels C, are cams C′, shown in Fig. 1. As the wheels revolve, the friction rollers h, which are shown in red lines in Fig. 1, are made to operate on the inner side of the rims, on the wheels C, the cam C′ causing the friction rollers which are fastened to a shaft which passes under the box, and is fastened to it, to rise, and thus elevate the box, and movable knife, causing the knife to pass up until the knives pass each other; and as the friction rollers pass off the cams, they fall suddenly, thus jarring the box in which the straw is placed, causing it to fall suddenly down on the guard e, when it is arrested. This guard is made adjustable to suit any length I may wish to cut my straw into.

In the operation of the box by means of the cams, and friction rollers, the box is elevated, while the movable bottom sinks to allow the lower knife to cut, and when the cut is made and the box falls down, the bottom comes up flush with the knife and thus aids in feeding the straw to the knives. The knives are so arranged that the straw is cut with a shear cut, which is the easiest way of cutting it.

Having thus fully described the construction, and operation of my invention, what I claim as new, and desire to secure by Letters Patent, is—

1. The wheels C, with the rim, and cams C′, on the inside of the rim, in combination with friction rollers h, for raising the box, with the knife b attached, and causing it to pass the edge of the stationary knife, which is placed in such a position as to give them the shear cut, as set forth.

2. I claim setting the box at an angle of about 45 degrees, and hung on a hinge, or pivot, with a joint or hinge d′ in the bottom, for feeding the straw to the knives, and for allowing the knife b to cut, as set forth.

EDWIN P. RUSSELL.

Witnesses:
   T. G. CLAYTON,
   H. L. HERVEY.